United States Patent
Livingston et al.

(10) Patent No.: US 7,351,040 B2
(45) Date of Patent: Apr. 1, 2008

(54) METHODS OF MAKING WIND TURBINE ROTOR BLADES

(75) Inventors: Jamie T. Livingston, Pensacola, FL (US); Arthur H. E. Burke, Gulf Breeze, FL (US); Jan Willem Bakhuis, Nijverdal (NL); Sjef Van Breugel, Enschede (NL); Andrew Billen, Daarlerveen (NL)

(73) Assignee: General Electric Company, Schenectady, NY (US)

( * ) Notice: Subject to any disclaimer, the term of this patent is extended or adjusted under 35 U.S.C. 154(b) by 193 days.

(21) Appl. No.: 11/328,625

(22) Filed: Jan. 9, 2006

(65) Prior Publication Data

US 2007/0160479 A1 Jul. 12, 2007

(51) Int. Cl.
F04D 29/38 (2006.01)
(52) U.S. Cl. ........................ 416/230; 416/248
(58) Field of Classification Search ................ 416/239, 416/230; 29/889.71
See application file for complete search history.

(56) References Cited

U.S. PATENT DOCUMENTS

| | | | |
|---|---|---|---|
| 4,915,590 A | 4/1990 | Eckland et al. | |
| 6,843,953 B2 | 1/2005 | Filsinger et al. | |
| 2003/0011094 A1 | 1/2003 | Filsinger et al. | |
| 2007/0107220 A1* | 5/2007 | Bakhuis et al. | 29/889.7 |

* cited by examiner

Primary Examiner—Richard A. Edgar
(74) Attorney, Agent, or Firm—Armstrong Teasdale LLP

(57) ABSTRACT

A method of manufacturing a root portion of a wind turbine blade includes, in an exemplary embodiment, providing an outer layer of reinforcing fibers including at least two woven mats of reinforcing fibers, providing an inner layer of reinforcing fibers including at least two woven mats of reinforcing fibers, and positioning at least two bands of reinforcing fibers between the inner and outer layers, with each band of reinforcing fibers including at least two woven mats of reinforcing fibers. The method further includes positioning a mat of randomly arranged reinforcing fibers between each pair of adjacent bands of reinforcing fibers, introducing a polymeric resin into the root potion of the wind turbine blade, infusing the resin through the outer layer, the inner layer, each band of reinforcing fibers, and each mat of random reinforcing fibers, and curing the resin to form the root portion of the wind turbine blade.

16 Claims, 2 Drawing Sheets

METHODS OF MAKING WIND TURBINE ROTOR BLADES

STATEMENT REGARDING FEDERALLY SPONSORED RESEARCH & DEVELOPMENT

The government of the United States of America has certain rights in this invention pursuant to NREL Subcontract No. NREL-ZAM-4-31235-05, Prime Contract No. DE-AC36-99GO10337 awarded by the U.S. Department of Energy.

BACKGROUND OF THE INVENTION

This invention relates generally to wind turbines, and more particularly to methods of fabricating wind turbine rotor blades.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted on a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox or directly coupled to the rotor. The gearbox, when present, steps up the inherently low rotational speed of the turbine rotor for the generator to efficiently convert mechanical energy to electrical energy, which is fed into a utility grid.

Known wind turbine blades are fabricated by infusing a resin into a fiber wrapped core. However, because the root section of the blade is thicker to accommodate high loads, known methods of infusing resins into thick parts do not always produce a defect free part within a cycle time that is no longer than the pot life of the infusion resin. One problem that can occur is the formation of dry spots where the infused resin has not reached. Some known solutions to these problems are to use added pre and/or post processes to infuse resin into dry spots. These solutions typically result in increased direct labor costs, increased part cycle time, and increased facilitation by machines or equipment for the additional processing.

BRIEF DESCRIPTION OF THE INVENTION

In one aspect, a method of manufacturing a root portion of a wind turbine blade is provided. The wind turbine blade includes a root portion, a main portion, and a tip portion. The method includes the steps of providing an outer layer of reinforcing fibers comprising at least two woven mats of reinforcing fibers, providing an inner layer of reinforcing fibers having an inner surface and an outer surface and comprising at least two woven mats of reinforcing fibers, positioning at least two bands of reinforcing fibers between the inner and outer layers, with each band of reinforcing fibers comprising at least two woven mats of reinforcing fibers. The method further includes positioning a mat of randomly arranged reinforcing fibers between each pair of adjacent bands of reinforcing fibers, introducing a polymeric resin into the root potion of the wind turbine blade, infusing the resin through the outer layer, the inner layer, each band of reinforcing fibers, and each mat of random reinforcing fibers, and curing the resin to form the root portion of the wind turbine blade.

In another aspect, a method of manufacturing a root portion of a wind turbine blade is provided. The wind turbine blade includes a root portion, a main portion, and a tip portion. The method includes the steps of providing an inner layer of reinforcing fibers comprising at least two woven mats of reinforcing fibers, the inner layer having an inner surface and an outer surface, positioning a first band of reinforcing fibers adjacent the outer surface of the inner layer, the first band having an inner surface and an outer surface, and comprising at least two woven mats of reinforcing fibers, and positioning a first mat of randomly arranged reinforcing fibers adjacent the outer surface of the first band of reinforcing fibers, the first mat having an inner surface and an outer surface. The method further includes positioning a second band of reinforcing fibers adjacent the outer surface of the first mat, the second band having an inner surface and an outer surface, and comprising at least two woven mats of reinforcing fibers, positioning an outer layer of reinforcing fibers comprising at least two woven mats of reinforcing fibers adjacent the second band, the outer layer having an inner surface and an outer surface, introducing a polymeric resin into the root potion of the wind turbine blade, infusing the resin through the outer layer, the inner layer, each band of reinforcing fibers, and each mat of random reinforcing fibers, and curing the resin to form the root portion of the wind turbine blade.

In another aspect, a wind turbine blade that includes a root portion, a main portion and a tip portion where the main portion is located between the root portion and the tip portion is provided. The root portion includes an outer layer of reinforcing fibers comprising at least two woven mats of reinforcing fibers, an inner layer of reinforcing fibers having an inner surface and an outer surface and comprising at least two woven mats of reinforcing fibers, and at least two bands of reinforcing fibers positioned between the inner layer and the outer layer, where each band of reinforcing fibers comprising at least two woven mats of reinforcing fibers. The root portion further includes a mat of randomly arranged reinforcing fibers positioned between each pair of adjacent bands of reinforcing fibers, and a polymeric resin infused through the outer layer, the inner layer, each band of reinforcing fibers, and each mat of random reinforcing fibers.

DETAILED DESCRIPTION OF THE INVENTION

A method of fabricating a wind turbine rotor blade root portion is described below in detail. The method uses the addition of mats formed from randomly arranged reinforcing fibers between bands of structural reinforcing fibers formed from at least two mats of woven reinforcing fibers. The random fiber mats facilitate the infusion of a polymeric resin throughout the thickness of the root section of the blade and the elimination of "dry spots" in the structure. The method reduces cycle times and cost by eliminating the need for secondary processes of building up thick sections of the wind turbine blade, i.e., the root section.

Figure 1:
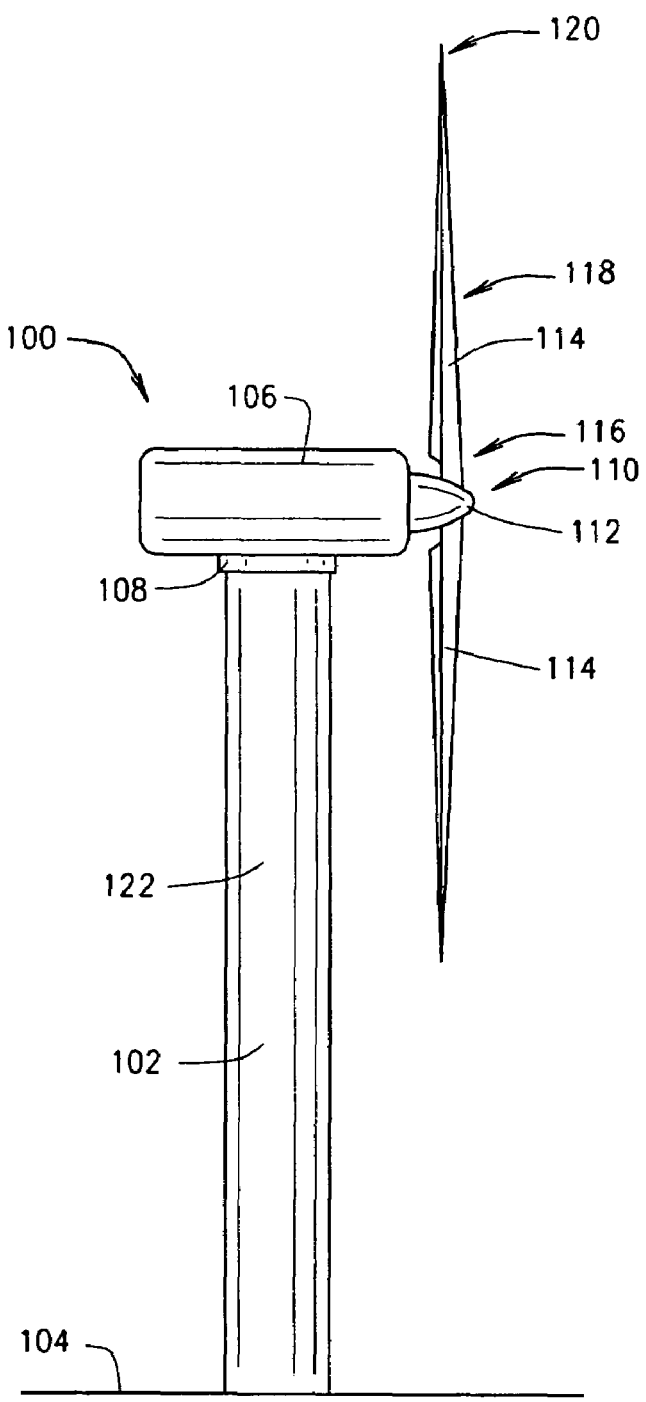
FIG. 1 is a side elevation schematic illustration of an exemplary configuration of a wind turbine.

Referring to the drawings, FIG. 1 is a side elevation schematic illustration of a wind turbine 100, such as, for example, a horizontal axis wind turbine. Wind turbine 100 includes a tower 102 extending from a supporting surface 104, a nacelle 106 mounted on a bedframe 108 of tower 102, and a rotor 110 coupled to nacelle 106. Rotor 110 includes a hub 112 and a plurality of rotor blades 114 coupled to hub 112. In the exemplary embodiment, rotor 110 includes three rotor blades 114. In an alternative embodiment, rotor 110 includes more or less than three rotor blades 114. Each rotor blade 114 includes a root portion 116, which connects rotor blade 114 to hub 112, a main body portion 118 and a tip portion 120. In the exemplary embodiment, tower 102 is fabricated from tubular steel and includes a cavity 122 extending between supporting surface 104 and nacelle 106. In an alternate embodiment, tower 102 is a lattice tower.

Various components of wind turbine 100, in the exemplary embodiment, are housed in nacelle 106 atop tower 102 of wind turbine 100. The height of tower 102 is selected based upon factors and conditions known in the art. In some configurations, one or more microcontrollers in a control system are used for overall system monitoring and control including pitch and speed regulation, high-speed shaft and yaw brake application, yaw and pump motor application, yaw and pump motor application and fault monitoring. Alternative distributed or centralized control architectures are used in alternate embodiments of wind turbine 100. In the exemplary embodiment, the pitches of blades 114 are controlled individually. Hub 112 and blades 114 together form wind turbine rotor 110. Rotation of rotor 110 causes a generator (not shown in the figures) to produce electrical power.

In use, blades 114 are positioned about rotor hub 112 to facilitate rotating rotor 110 to transfer kinetic energy from the wind into usable mechanical energy. As the wind strikes blades 114, and as blades 114 are rotated and subjected to centrifugal forces, blades 114 are subjected to various bending moments. As such, blades 114 deflect and/or rotate from a neutral, or non-deflected, position to a deflected position. Moreover, a pitch angle of blades 114 can be changed by a pitching mechanism (not shown) to facilitate increasing or decreasing blade 114 speed, and to facilitate reducing tower 102 strike.

Figure 2:
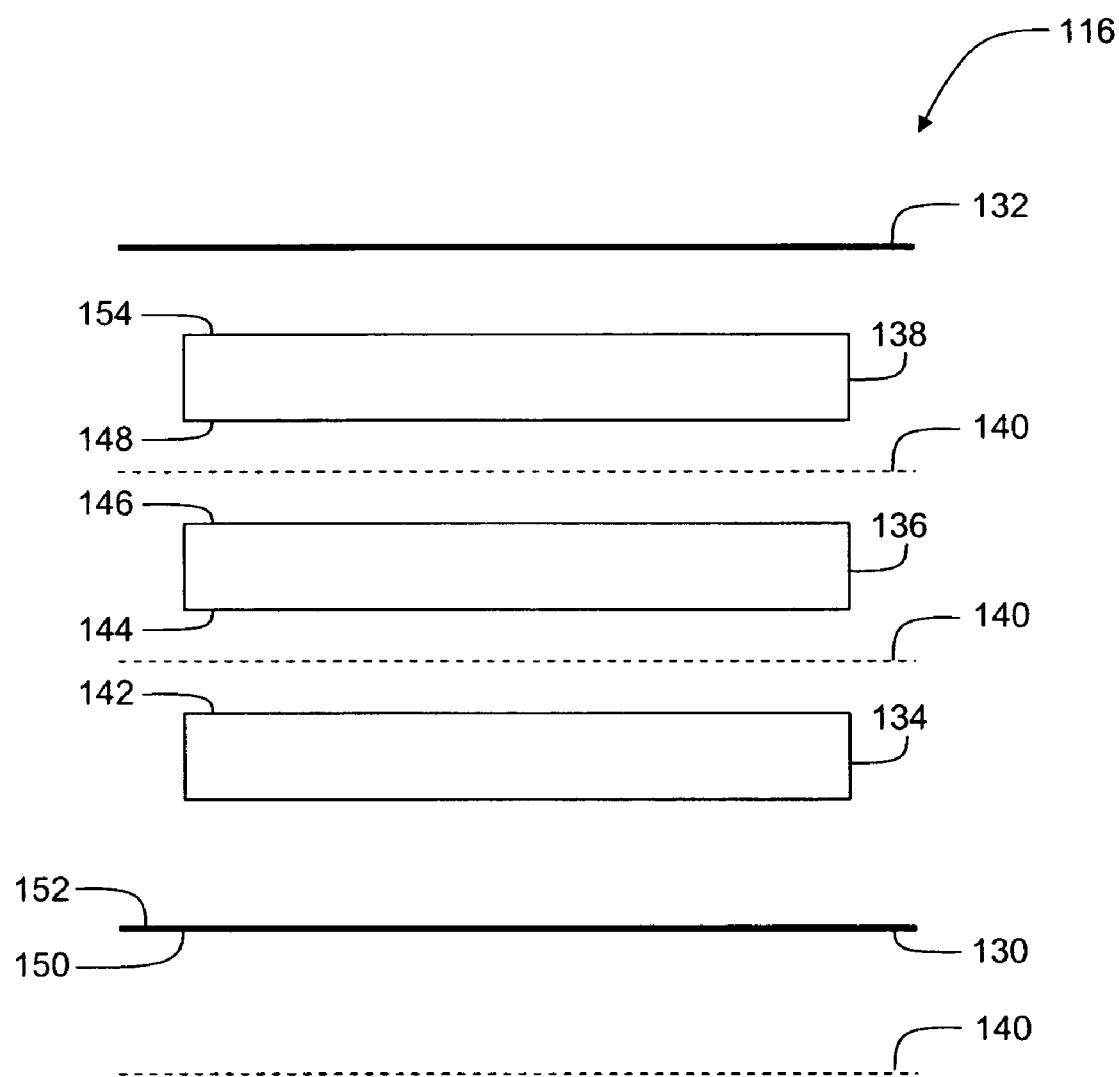
FIG. 2 is an exploded sectional illustration of a portion of the root section of one of the wind turbine rotor blades shown in FIG. 1.

Referring to FIG. 2, root portion 116 is formed from a plurality of layers of reinforcing fibers infused with a polymeric resin. Specifically, root portion 116 includes an inner layer 130 and an outer layer 132. Inner layer 130 and outer layer 132 are each formed from at least two mats of woven reinforcing fibers stacked on top of one another. Positioned between inner and outer layers 130 and 132 are at least two bands of reinforcing fibers. In the exemplary embodiment shown in FIG. 2, a first band 134 of reinforcing fibers, a second band 136 of reinforcing fibers, and a third band 138 of reinforcing fibers are positioned between inner and outer layers 130 and 132. First, second, and third bands 134, 136, and 138 are each formed from at least two mats of woven reinforcing fibers stacked on top of each other. Examples of suitable reinforcing fibers used in inner and outer layers 130 and 132, and first, second, and third bands 134, 136, and 138, include, but are not limited to, glass fibers, graphite fibers, carbon fibers, polymeric fibers, ceramic fibers, aramid fibers, kenaf fibers, jute fibers, flax fibers, hemp fibers, cellulosic fibers, sisal fibers, coir fibers and mixtures thereof.

In addition, facilitate the infusion of a polymeric resin throughout the thickness of root portion 116, a mat 140 of randomly arranged reinforcing fibers is positioned between each adjacent band of reinforcing fibers. In the exemplary embodiment shown in FIG. 2, one random fiber mat 140 is positioned between an outer surface 142 of first band 134 of reinforcing fibers and an inner surface 144 of second band 136 of reinforcing fibers. Another random fiber mat 140 is positioned between an outer surface 146 of second band 136 of reinforcing fibers and an inner surface 148 of third band 138 of reinforcing fibers. Additionally, another random fiber mat can be positioned adjacent an inner surface 150 of inner layer 130. A polymeric resin is infused into root portion 116 including inner layer 130, first, second, and third bands 134, 136, and 138 of reinforcing fibers, random fiber mats 140, and outer layer 132 to provide integrity and strength to root portion 116 and blade 114. Examples of suitable resins include, but are not limited to, vinyl ester resins, epoxy resins, polyester resins, and mixtures thereof.

To form root portion 116 of wind turbine blade 114, first band 134 of reinforcing fibers is positioned adjacent an outer surface 152 of inner layer 130 and a random fiber mat 140 is then positioned adjacent outer surface 142 of first band 134 of reinforcing fibers. Then second band 136 of reinforcing fibers is positioned adjacent the random fiber mat 140. Another random fiber mat 140 is positioned adjacent outer surface of second band 136 of reinforcing fibers and then third band 138 of reinforcing fibers is positioned adjacent the random fiber mat 140. Outer layer 132 is then positioned adjacent an upper surface 154 of third band 136. Optionally another random fiber mat can be positioned adjacent inner surface 150 of inner layer 130. The polymeric resin is infused into the lay-up of reinforcing fiber layers under vacuum and then cured.

While the invention has been described in terms of various specific embodiments, those skilled in the art will recognize that the invention can be practiced with modification within the spirit and scope of the claims.

What is claimed is:

1. A method of manufacturing a root portion of a wind turbine blade, the wind turbine blade including a root portion, a main portion, and a tip portion, said method comprising:

providing an outer layer of reinforcing fibers comprising at least two woven mats of reinforcing fibers;

providing an inner layer of reinforcing fibers having an inner surface and an outer surface and comprising at least two woven mats of reinforcing fibers;

positioning at least two bands of reinforcing fibers between the inner and outer layers, each band of reinforcing fibers comprising at least two woven mats of reinforcing fibers;

positioning a mat of randomly arranged reinforcing fibers between each pair of adjacent bands of reinforcing fibers;

introducing a polymeric resin into the root potion of the wind turbine blade;

infusing the resin through the outer layer, the inner layer, each band of reinforcing fibers, and each mat of random reinforcing fibers; and curing the resin to form the root portion of the wind turbine blade.

2. A method in accordance with claim 1 further comprising positioning an additional mat of randomly arranged reinforcing fibers adjacent the inner surface of the inner layer of reinforcing fibers.

3. A method in accordance with claim 1 wherein the reinforcing fibers comprise at least one of glass fibers, graphite fibers, carbon fibers, ceramic fibers, aramid fibers, kenaf fibers, jute fibers, flax fibers, hemp fibers, cellulosic fibers, sisal fibers, and coir fibers.

4. A method in accordance with claim 1 wherein the resin comprises at least one of vinyl ester resins, epoxy resins, and polyester resins.

5. A method in accordance with claim 1 wherein infusing the resin through the outer layer, the inner layer, each band of reinforcing fibers, and each mat of random reinforcing fibers comprises applying a vacuum to the root portion of the wind turbine blade.

6. A method of manufacturing a root portion of a wind turbine blade, the wind turbine blade including a root portion, a main portion, and a tip portion, said method comprising:
provide an inner layer of reinforcing fibers comprising at least two woven mats of reinforcing fibers, the inner layer having an inner surface and an outer surface;
positioning a first band of reinforcing fibers adjacent the outer surface of the inner layer, the first band having an inner surface and an outer surface, and comprising at least two woven mats of reinforcing fibers;
positioning a first mat of randomly arranged reinforcing fibers adjacent the outer surface of the first band of reinforcing fibers, the first mat having an inner surface and an outer surface;
positioning a second band of reinforcing fibers adjacent the outer surface of the first mat, the second band having an inner surface and an outer surface, and comprising at least two woven mats of reinforcing fibers;
positioning an outer layer of reinforcing fibers comprising at least two woven mats of reinforcing fibers adjacent the second band, the outer layer having an inner surface and an outer surface;
introducing a polymeric resin into the root potion of the wind turbine blade;
infusing the resin through the outer layer, the inner layer, each band of reinforcing fibers, and each mat of random reinforcing fibers; and
curing the resin to form the root portion of the wind turbine blade.

7. A method in accordance with claim 6 further comprising positioning a second mat of randomly arranged reinforcing fibers and a third band of reinforcing fibers between the second band of reinforcing fibers and the outer layer before introducing the polymeric resin into the root portion of the wind turbine blade.

8. A method in accordance with claim 7 further comprising positioning an third mat of randomly arranged reinforcing fibers adjacent the inner surface of the inner layer of reinforcing fibers.

9. A method in accordance with claim 6 further comprising positioning at least two additional mats of randomly arranged reinforcing fibers and at least two additional bands of reinforcing fibers between the second band of reinforcing fibers and the outer layer before introducing the polymeric resin into the root portion of the wind turbine blade.

10. A method in accordance with claim 6 wherein the reinforcing fibers comprise at least one of glass fibers, graphite fibers, carbon fibers, ceramic fibers, aramid fibers, kenaf fibers, jute fibers, flax fibers, hemp fibers, cellulosic fibers, sisal fibers, and coir fibers.

11. A method in accordance with claim 6 wherein the resin comprises at least one of vinyl ester resins, epoxy resins, and polyester resins.

12. A method in accordance with claim 6 wherein infusing the resin through the outer layer, the inner layer, each band of reinforcing fibers, and each mat of random reinforcing fibers comprises applying a vacuum to the root portion of the wind turbine blade.

13. A wind turbine blade comprising a root portion, a main portion and a tip portion wherein said main portion is located between said root portion and said tip portion, said root portion comprising:
an outer layer of reinforcing fibers comprising at least two woven mats of reinforcing fibers;
an inner layer of reinforcing fibers having an inner surface and an outer surface and comprising at least two woven mats of reinforcing fibers;
at least two bands of reinforcing fibers positioned between said inner layer and said outer layer, each said band of reinforcing fibers comprising at least two woven mats of reinforcing fibers;
a mat of randomly arranged reinforcing fibers positioned between each pair of adjacent bands of reinforcing fibers; and
a polymeric resin infused through said outer layer, said inner layer, each said band of reinforcing fibers, and each said mat of random reinforcing fibers.

14. A wind turbine blade in accordance with claim 13 further comprising an additional mat of randomly arranged reinforcing fibers positioned adjacent the inner surface of the inner layer of reinforcing fibers.

15. A wind turbine blade in accordance with claim 13 wherein the reinforcing fibers comprise at least one of glass fibers, graphite fibers, carbon fibers, ceramic fibers, aramid fibers, kenaf fibers, jute fibers, flax fibers, hemp fibers, cellulosic fibers, sisal fibers, and coir fibers.

16. A wind turbine blade in accordance with claim 13 wherein the resin comprises at least one of vinyl ester resins, epoxy resins, and polyester resins.

* * * * *

UNITED STATES PATENT AND TRADEMARK OFFICE
CERTIFICATE OF CORRECTION

PATENT NO.        : 7,351,040 B2  
APPLICATION NO.   : 11/328625  
DATED             : April 1, 2008  
INVENTOR(S)       : Livingston et al.

Page 1 of 1

It is certified that error appears in the above-identified patent and that said Letters Patent is hereby corrected as shown below:

Column 3, line 27, delete "yaw and pump motor application and fault" and insert therefor -- and fault --.

Signed and Sealed this

Twenty-first Day of July, 2009

JOHN DOLL  
*Acting Director of the United States Patent and Trademark Office*